United States Patent
Chai et al.

(10) Patent No.: US 7,802,005 B2
(45) Date of Patent: Sep. 21, 2010

(54) METHOD AND APPARATUS FOR CONFIGURING BUFFERS FOR STREAMING DATA TRANSFER

(75) Inventors: Sek M Chai, Streamwood, IL (US); Nikos Bellas, Chicago, IL (US); Malcolm R Dwyer, Glendale Heights, IL (US); Daniel A Linzmeier, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 709 days.

(21) Appl. No.: 11/694,523

(22) Filed: Mar. 30, 2007

(65) Prior Publication Data

US 2008/0244152 A1 Oct. 2, 2008

(51) Int. Cl.
*G06F 15/16* (2006.01)
(52) U.S. Cl. ...................... 709/231; 711/170
(58) Field of Classification Search ................. 370/536; 710/33, 48; 711/1, 170; 716/18; 709/231
See application file for complete search history.

(56) References Cited

U.S. PATENT DOCUMENTS

| | | | |
|---|---|---|---|
| 6,941,548 B2 | 9/2005 | Goodwin | |
| 7,305,649 B2 | 12/2007 | Bellas et al. | |
| 7,603,492 B2 | 10/2009 | Chai et al. | |
| 2003/0172224 A1* | 9/2003 | Gulick et al. | 711/1 |
| 2004/0117595 A1 | 6/2004 | Norris et al. | |
| 2005/0030980 A1* | 2/2005 | Debique et al. | 370/536 |
| 2006/0031791 A1 | 2/2006 | Moona et al. | |
| 2006/0224786 A1* | 10/2006 | Mukaide et al. | 710/48 |
| 2006/0242617 A1* | 10/2006 | Bellas et al. | 716/18 |
| 2007/0067508 A1* | 3/2007 | Chai et al. | 710/33 |
| 2008/0120497 A1 | 5/2008 | Chai et al. | |

* cited by examiner

*Primary Examiner*—Jungwon Chang

(57) ABSTRACT

A specification of a configurable processor is generated by generating (1) specifications of first and second stream memory interfaces to be operable to access data in accordance with first and second stream descriptors, and (2) a specification of an interim data storage device (buffer) to be accessed by the first and second stream memory interfaces and to be operable to receive data from a first computational module via the first stream memory interface and to transfer data to a second computational module via the second stream memory interface. The specifications are output and may be used to configure a configurable processor.

9 Claims, 5 Drawing Sheets

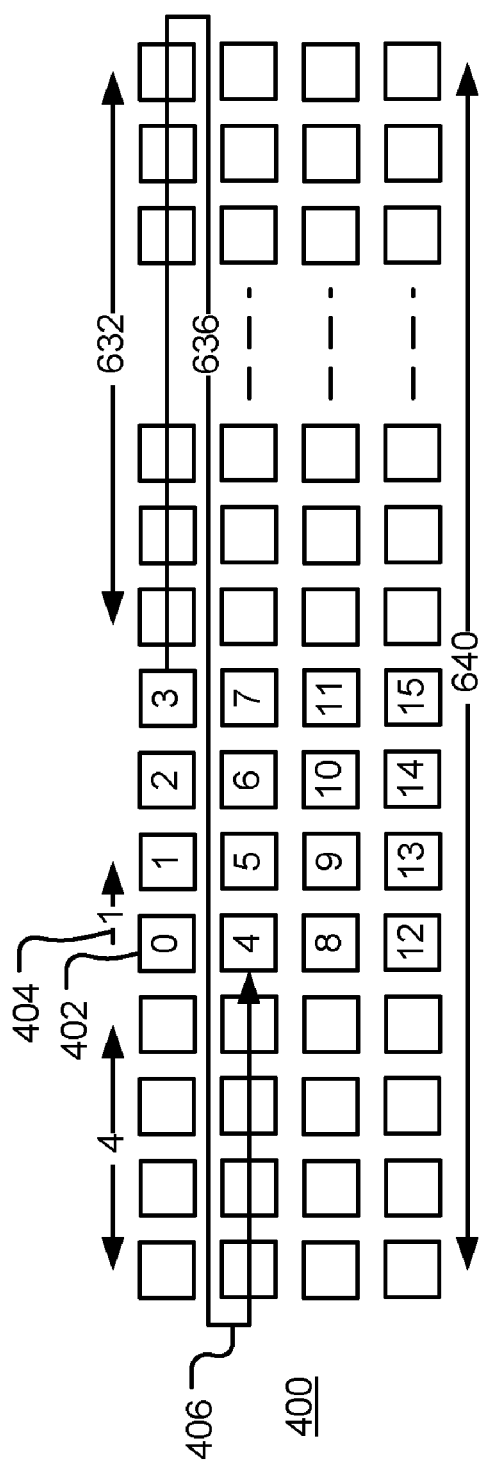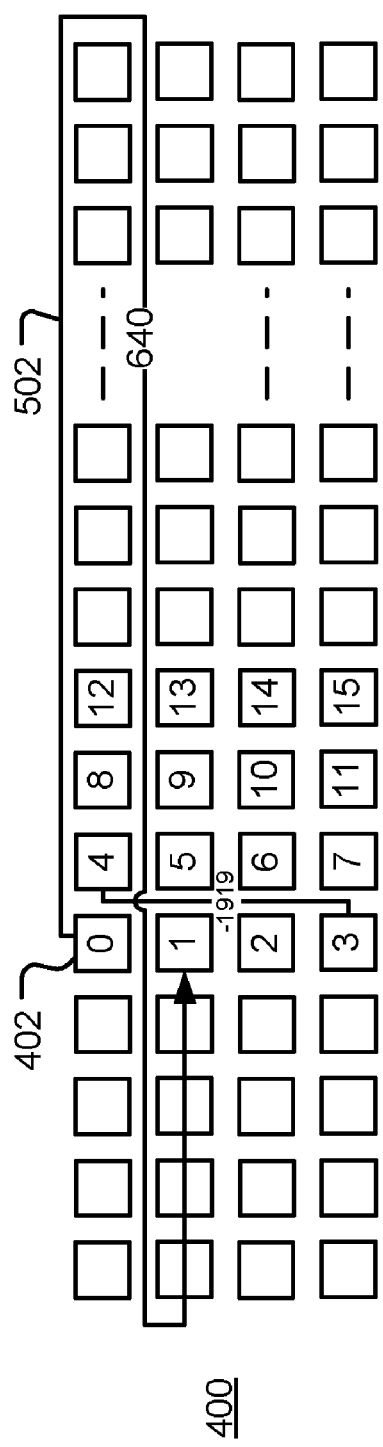

| STREAM | HEAD | TAIL | SA | STRIDE | SPAN0 | SKIP0 | SPAN1 | SKIP1 | TYPE | COUNT | ATTRIBUTES |
|---|---|---|---|---|---|---|---|---|---|---|---|
| S0 | T0 | M0 | 00 | 1 | 1 | 1 | 1 | 200 | 0 | 16 | DRAM |
| S1 | T0 | M1 | FF | 1 | 1 | 1 | 1 | 1 | 0 | 16 | RAM FIFO |
| S2 | M2 | T0 | AB | 1 | 4 | 636 | 1 | 1 | 0 | 16 | RAM BUFFER |
| S3 | T1 | M3 | AB | 640 | 4 | -1919 | 1 | 1 | 0 | 16 | RAM BUFFER |

METHOD AND APPARATUS FOR CONFIGURING BUFFERS FOR STREAMING DATA TRANSFER

FIELD OF THE INVENTION

The present invention relates generally to processing systems and, in particular, to the automatic configuration of processing systems.

BACKGROUND

In processing devices with decoupled architectures, memory access and computation are performed by separate (decoupled) hardware modules. For general purpose computing, the hardware may be further decoupled by introducing a control processing module in addition to the memory access and computation modules.

Streaming applications produce interim data; data that is produced and consumed by pairs of hardware accelerators. Prior approaches use a memory mapped buffer as a peripheral to store interim data that is generic to all interim data, and therefore not efficient for any access pattern. Alternative approaches include the use of external memory (DRAM) to store interim data. All of these approaches require extra bus ports, which lead to lower bus speeds and larger gate counts.

In one prior design approach for devices with a decoupled architecture, a data-flow-graph (DFG) is used to define the computation and a set of stream descriptors are used to define data access patterns. This approach has the ability to generate hardware automatically from the DFG and stream descriptors. In addition, some efforts have been made to develop tools that allow programs developed in high level languages, such as C/C++, to be converted into hardware (for example by programming the gates of an FPGA). The generated hardware tends to be inefficient unless the high level language includes features, such as memory access threads and computation threads, with the flexibility to describe both the computational task and data movement. These features allow streaming data access to memory and/or other hardware accelerators in a computation pipeline.

The use of high level languages for hardware programming aids software engineers who do not have system architecture or hardware expertise but may be familiar with high level languages (HLL's) such as C/C++ that are used to program embedded systems with DSPs or microcontrollers.

Stream descriptors have been used to access data in memory as streams and have also been used to generate stream data interface logic. In contrast, interim data storage of data being moved between computational modules has been handled by memory mapped buffers and/or first in first out (FIFO) buffers.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 4 and 5 are diagrammatic representations of accessed locations in memory.

Figure 1:
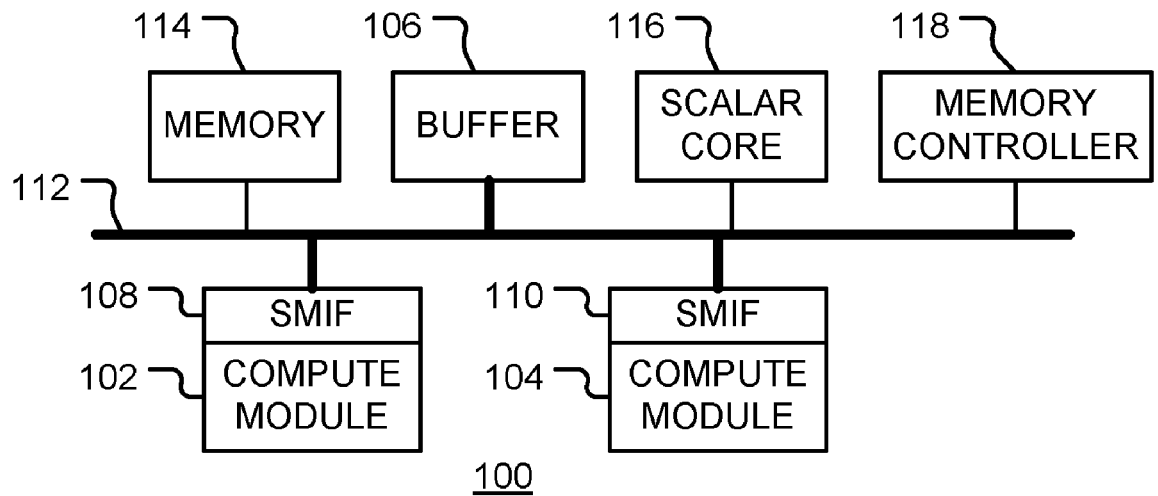
FIG. 1 is a block diagram of a processing system with interim data storage in accordance with the prior art.

Skilled artisans will appreciate that elements in the figures are illustrated for simplicity and clarity and have not necessarily been drawn to scale. For example, the elements in the figures may be simplified to aid understanding of embodiments of the present invention.

DETAILED DESCRIPTION

Before describing in detail embodiments that are in accordance with the present invention, it should be observed that the embodiments reside primarily in combinations of method steps and apparatus components related to configuration of buffers for streaming data transfer. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that some of the embodiments of the invention described herein may comprise one or more conventional processors and unique stored program instructions that control the one or more processors to implement, in conjunction with certain non-processor circuits, some, most, or all of the functions for automatic configuration of buffers for streaming data transfer described herein. The non-processor circuits may include, for example, data access modules such as user input devices and peripherals. As such, these functions may be interpreted as a method to configure buffers for streaming data transfer.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

One aspect of the present invention relates to a method to configure buffers for interim data storage between data source and destinations for streaming data transfers based on stream descriptor parameters. A buffer, also referred to as an interim data storage device, may be configured manually by a user, automatically by a computer, or by a user interaction with a computer.

FIG. 1 is a block diagram of a processing system with interim data storage in accordance with the prior art. Referring to FIG. 1, the system 100 includes computational modules 102 and 104 that may be, for example, hardware accelerators. The computational modules 102 and 104 are coupled to a buffer 106 via stream memory interfaces (SMIF's) 108 and 110, respectively, and system bus 112. The buffer 106 operates as a memory-mapped peripheral, and requires bus port to allow it to connect with the system bus 112. A memory 114 and a scalar processing core 116 are also coupled to the system bus 112. The addition of a memory-mapped buffer 106 to the system bus 112 increases the load on the memory controller 118. In addition, is increases the load on the system bus 112 and limits the speed of the computational modules 102 and 104.

The processing system in FIG. 1 has a decoupled architecture, in that memory access is handled by the stream memory interfaces 108 and 110, while computation is handled by computational modules 102 and 104.

Figure 2:
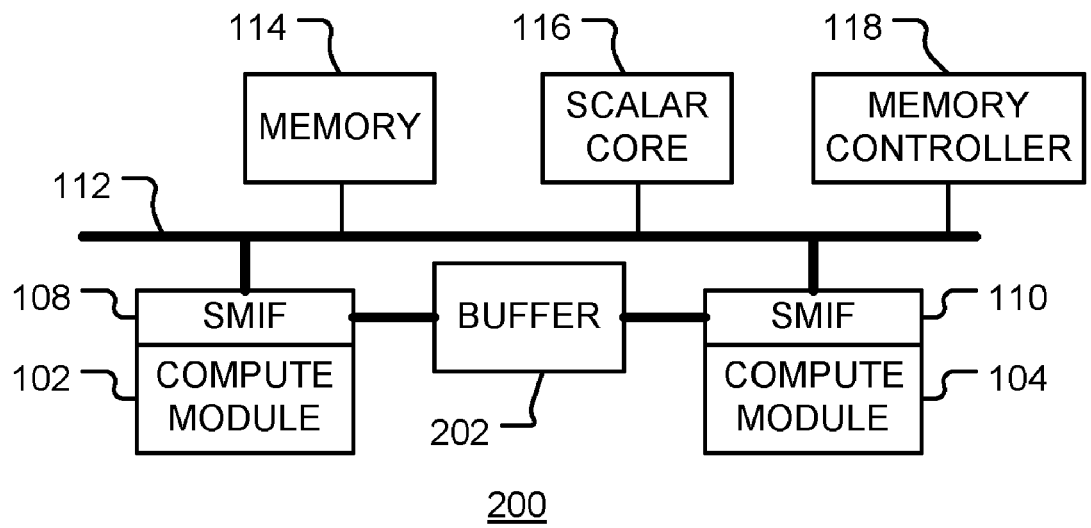
FIG. 2 is a block diagram of a processing system with interim data storage in accordance with some embodiments of the invention.

FIG. 2 is a block diagram of a processing system with interim data storage in accordance with some embodiments of the invention. Referring to FIG. 2, the system 200 includes computational modules 102 and 104 that may be, for example, hardware accelerators or other datapath elements. The computational modules 102 and 104 are coupled to a memory 114 and a scalar processing core 116 via stream memory interfaces (SMIF's) 108 and 110, respectively, and via system bus 112. However, interim data transferred between the computational modules 102 and 104 may be stored in buffer 202. In operation, the buffer 202 is accessible via the SMIF's 108 and 110 as streams. That is, memory access patterns (shape and location) within the buffer are determined by stream descriptors (such as START_ADDRESS, STRIDE, SPAN, SKIP, TYPE, etc.). The SMIF's 108 and 110 include computation logic that determines a sequence of buffer locations in accordance with the stream descriptors. This approach avoids loading the memory controller or system bus for interim data storage, and allows the computational modules 102 and 104 to be freed from bus speed limitations.

The SMIF's 108 and 110 may be implemented using a reconfigurable logic circuit. Stream descriptors contain data access patterns (parameters that describe the shape and location of stored data) which can be used to configure an efficient buffer. Reconfigurable platforms, such as field programmable gate arrays (FPGA's) allow configuration of memory hierarchy for different applications. Some of this memory may be configured a buffer 202. Stream descriptors can be used to define stream data transfers between computational modules, which may also be implemented using reconfigurable logic.

Alternatively, the SMIF's 108 and 110, buffer 202 and computational modules may be implemented using one or more custom logic circuits, such an application specific integrated circuit (ASIC) or structured ASIC, this is configured only once.

The stream memory interfaces 108 and 110 may also be referred to as stream access modules, stream device or stream data interfaces, for example. The buffer 202 is also referred to as an interim data storage device.

In accordance with an embodiment of a further aspect of the invention, a specification of a configurable processor is generated automatically by generating (1) a specification of a first stream memory interface operable to access data in accordance with a first stream descriptor, (2) a specification of a second stream memory interface operable to access data in accordance with a second stream descriptor, and (3) a specification of an interim data storage device to be accessed by the first stream memory interface and the second stream memory interface and to be operable to receive data from a first computational module via the first stream memory interface and to transfer data to a second computational module via the second stream memory interface. The specification of the configurable processor, which comprises the specifications of the first stream memory interface, the second stream memory interface and the interim data storage device, may be output to a configurable or reconfigurable processor, a communication channel or to a computer readable storage device.

One embodiment of the present invention relates to the configuration of processing hardware from a C/C++ language description of a process. The C/C++ language provides a multi-threaded framework. Computation and communication are decoupled explicitly using the ability of the C/C++ language to describe multiple program threads. Computation and memory access are defined in separate threads that facilitate scheduling of the process in the hardware. Computation threads are implemented by computational modules while data access threads are executed by stream memory interfaces (SMIF's). The computational threads are also referred to as computation kernels or functions. Buffers and associated stream memory interfaces are used to communicate among computational modules and data access modules. The communication among computation threads, referred to as data channels, may be implemented, for example, with direct connections, in addition to the buffers.

In prior approaches computation and memory access are interleaved within the same program thread. In such approaches, a compiler has the more difficult task find the parallelism in between computation and data transfers in order to overlap the operations. The memory access patterns are less efficient because they are inferred by the compiler and may not match the intent of the programmer. The compiler applies a series of code transformations to eliminate dependencies, and then generates sequences of load/store instructions based on new access patterns of the transformed loop. This means that data transfer depends on the access pattern inferred by the compiler from the loop structure. The use of stream descriptors in accordance with the present invention enables complex access patterns that are not easily discernible from nested loop structures. Stream descriptors also decouple memory address generation from the actual computation allowing grouped data elements to better match the underlying memory hierarchy.

In one embodiment of the invention, processing hardware is configured automatically for an application defined by a plurality of programming instructions of a high level language that include stream descriptors, descriptive of data access locations, data access thread definitions, and computation thread definitions. The automatic configuration is achieved by compiling the programming instructions using a first compiler to produce a description of data flow between the data access threads and the computational threads. A second compiler is then used to generate a hardware description and executable code dependent upon the description of the data flow. Finally, a programmer is used configure the processing hardware in accordance with the hardware description. In particular, the programmer configures stream memory interfaces operable to access data in accordance with the stream descriptors, computational modules operable to process data in accordance with the computation thread definitions, and at least one buffer (such as a tile buffer) that is operable to pass interim data between the computational modules via the stream memory interfaces, in accordance with the description of the data flow.

In prior approaches, interim buffers have been accessed via a bus structure rather than via stream memory interfaces.

In a further embodiment of the invention, a system for automatic configuration of processing hardware includes an application program interface (API) tool that includes a data access thread class, a computation thread class and a stream descriptor data type. The API tool is operable to enable a programmer to produce an application program that defines data access threads, computation threads, stream descriptors and data movement between the threads. The system also includes a compiler that is operable to compile the application program to produce a description of data flow referencing the data access threads, the computation threads and stream descriptors of the application program, a means for generating a hardware description and executable code dependent upon the description of the data flow, and a means for configuring the processing hardware in accordance with the hardware description.

To configure the processing system, a programmer generates a set of programming instructions of a high level language to define the application. The set of programming instructions includes data access thread definitions dependent upon a software class template for a data access thread (each data access thread having a stream descriptor as a parameter, and, optionally, one of a data channel source and a data channel sink as a parameter), computation thread definitions dependent upon a software class template for a computation thread (each computation thread definition having a function pointer, a data channel source and a data channel sink as parameters); and stream descriptor definitions, descriptive of memory access locations. The set of programming instructions is compiled to produce a description of a data flow between the data access threads and the computational threads. Stream memory interfaces, operable to access a memory in accordance with the stream descriptor definitions, are configured in the processing system hardware, along with computational modules operable to process data in accordance with the computation thread definitions and one or more buffers operable to connect the computational modules in accordance with the description of the data flow.

In one embodiment, the processing hardware is a hardware accelerator that performs specific computations more efficiently than a general purpose main processor to which it is connected. The hardware accelerator includes a streaming memory interface (data access device) and a computational module. The streaming memory interface is used to prefetch, stage and align stream data elements, based upon a set of stream descriptors. For example, the stream descriptors may be START_ADDRESS, STRIDE, SKIP, SPAN, TYPE and COUNT values that define the location of data values in a memory. The computational module performs computations (adds, multiples, etc.) defined in the computation threads. In this example, the streaming memory interfaces, which control memory access, are decoupled from the computational modules, which perform computations.

Stream descriptors decouple memory address generation from the actual computation by relying on the programmer's knowledge of the algorithm. The programmer uses stream descriptors to express the shape and location of data in memory. The stream memory interfaces use these stream descriptors to fetch data from memory and present the aligned data in the order required by the computing platform. This decoupling allows the stream memory interface to take advantage of available memory bandwidth to prefetch data before it is needed. The system becomes dependent on average bandwidth of the memory subsystem with less sensitivity to the peak latency to access a particular data element. In addition, it benefits from having fewer stalls due to slow memory accesses, alleviating memory wall issues. In particular, the use of a buffer for interim data storage avoids performance limitations of the system bus and associated memory controller.

In addition, program threads offer a natural, well understood, programming framework to describe concurrently executing components. Threads can represent, for example, a function/loop or a cluster of functions/loops.

The stream descriptors may be included in a set of programming instructions of a high level language that define an application. The programming instructions further include computation thread definitions and memory access thread definitions. The programming instructions are compiled to produce a description of a data flow between the computational threads and the memory access threads to produce a control flow graph (CFG) that includes references to the computation threads, and to produce a symbol table with references to the data access thread, the computation threads and the stream descriptors. The specification of the interim data storage device may be generated with reference to the symbol table.

The hardware may be a reconfigurable vector processor, a field programmable gate array (FPGA) or an application specific integrated circuit (ASIC), for example.

Figure 3:
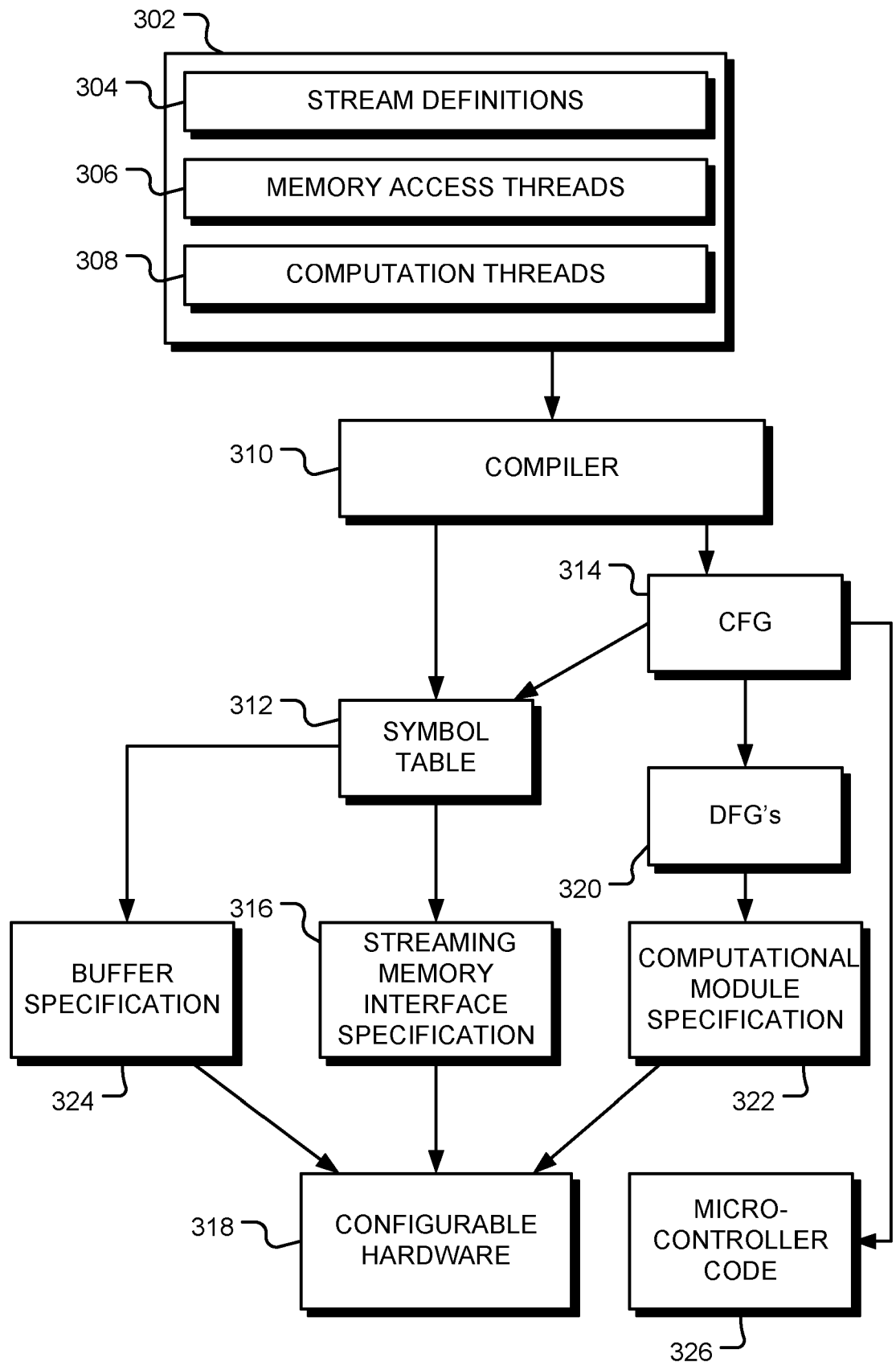
FIG. 3 is a diagram of an exemplary method and apparatus, in accordance with some embodiments of the invention, for configuring hardware of a processing system.

FIG. 3 is a diagram of an exemplary method and apparatus for configuring hardware of a processing system. Referring to FIG. 3, a multi-threaded application 302 includes stream definitions 304, memory access thread definitions 306 and computation thread definitions 308. The multi-threaded application may be compiled by a front-end compiler 310 to generate a symbol table 312 and a control flow graph (CFG) 314. Front end compilers are well known to those of ordinary skill in the art. A generic front end compiler may be used. The CFG 314 identifies the dependencies between the different threads of the application (both memory access threads and computation threads). The symbol table 312 is used to aggregate references to the stream descriptors. The stream descriptors are used to generate a streaming memory interface specification 316. The specification 316 specifies how the streaming memory interface devices are to be implemented in the configurable hardware 318 and may be used to configure the hardware. The hardware may be configurable only once, during manufacture, or may be re-configurable. An example of reconfigurable hardware is a field programmable gate array (FPGA). The specifications 316, 322 and 324 may be expressed using register transfer level (RTL) description of a digital processor. This description may be stored in a computer readable medium, such as a computer memory or computer disc.

In addition, microcontroller code 326 may be generated for a scalar processing core. This enables elements of the CFG that are not performed by the data path elements to be performed by a scalar core, such as a general purpose microcontroller core. The microcontroller code may be expressed in an executable and linkable format, for example, and stored in a computer readable medium.

In one embodiment of the invention, one or more dataflow graphs (DFG's) 320 are generated based on the set of operations in the computational threads in the CFG 314. A data flow graph is a directed graph that does not contain any conditional elements, such as branch points. In contrast, the CFG can contain conditional elements. The symbol table 312 is used to aggregate references to each thread name and each function pointer. For each function, a DFG 320 is created to describe the set of operations in graph notation. The DFG graph is used to generate a specification 322 of the stream data path for the processor. The specification 322 specifies how stream data path devices are to be implemented in the configurable hardware 318 and may be used to configure the hardware.

In accordance with one aspect of the present invention, the symbol table 312 is also used to generate a buffer specification 324. The buffer specification describes how a buffer for storing interim data transferred between computational modules is to be implemented in the hardware 318. The buffer may be a tile buffer or a FIFO (first in, first out) buffer, for example.

In the approach described above, the stream descriptors are included in a set of programming instructions of a high level language that define an application. The programming instructions may also include computation thread definitions and memory access threads. The programming instructions are compiled to produce a description of the data flow between the computational threads and the memory access threads together with a control flow graph (CFG) including references to the computation threads and a symbol table with references to the data access thread, the computation threads and the stream descriptors. The resulting specification of the interim data storage device (the buffer) is generated with reference the symbol table.

It will be apparent to those of ordinary skill in the art that buffer specification may be obtained by other means. However, in the present invention, buffer access is controlled in accordance with stream descriptors.

FIGS. 4 and 5 show examples of data access dependent upon the stream descriptors. In FIG. 4, a memory 400 includes 16 locations (number 0-15 in the figure) to be accessed in the order indicated. The START_ADDRESS value is the address of the first memory location 402 to be accessed. This address is incremented by the stride value following each access. Once 'SPAN' locations have been accessed, the address is increment by the SKIP value. The TYPE value determines the size (in bits or bytes for example) of each memory location and the COUNT values is the total number of memory locations to the accessed. Multiple SKIP and SPAN values may be used for more complicated memory access patterns. In FIG. 4, the stride (404) is 1. The SPAN is 4, So the four locations 0, 1, 2, and 3 are accessed before the SKIP value is applied. The SKIP value (406) is 636, which moves the memory address to the address of memory location 4, since there are 640 locations in each row of this exemplary memory array.

In FIG. 5, the same area or tile of memory is accessed, but the elements are accessed in a different order. The START_ADDRESS value 402 is unchanged. In this example, the stride (502) is 640. The SPAN is 4, So the four locations 0, 1, 2, and 3 are accessed before the SKIP is applied. The SKIP value is −1919, which moves the memory address to the address of memory location 4, since there are 640, locations in each row of this exemplary memory array (move back 3 rows then move forward 1 ⇒SKIP=−3×640+1=−1919). If the data is written to a memory by a first computational module as shown in FIG. 4, and then read from the memory by a second computational module as shown in FIG. 5, a common tile buffer may be used for interim data storage. However, a common FIFO buffer cannot be used since the access orders are different. The tile buffer may be accessed by two different computational modules, each computational module using its own SMIF and its own set of stream descriptors to access the buffer.

Figures 6, 7:
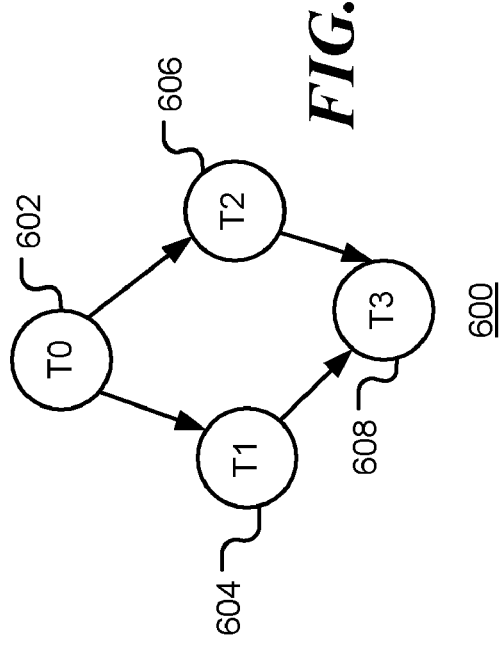
FIG. 6 is an exemplary control flow graph in accordance with certain embodiments of the invention.
FIG. 7 is an exemplary section of a symbol table in accordance with certain embodiments of the invention.

FIG. 6 shows an exemplary control flow graph (CFG) 600. In this example, there are four computation threads, 602, 604, 606 and 608. Threads T1 and T2 (604 and 606) are both children of thread T0 (602), and therefore are dependent upon T0. Similarly, thread T3 (608) is a child of threads T1 and T2 (604 and 606), and is thus dependent upon threads T1 and T2. The CFG may go through several optimizations during compilation. The original CFG might include computation, data access, and memory access threads. However, during compiler optimization, the CFG can change For example, when two computation threads are combined, or when a FIFO or buffer is inserted between hardware generated from computation threads, there is no longer a need for memory access threads, because memory access is not required when using the FIFO or buffers. The CFG shown in FIG. 6 shows how computation will flow, while the associated data access threads support the computation flow in producing/consuming data.

An exemplary section of a symbol table is shown in FIG. 7. The symbol table 700 contains a set of parameters, with labels as defined in header row 702. The symbol table 700 lists symbols declared in the program and the parameters associated with them, such as memory locations. In accordance with one embodiment of the invention, the symbols include streams, defined by a program instruction such as:

stream S0(START_ADDRESS, SKIP, stride, SPAN, TYPE, COUNT);

This instruction defines how data values for stream S0 are to be retrieved from memory. The parameters, START_ADDRESS, SKIP, stride, SPAN, TYPE, COUNT, etc., are stream descriptors that are used by a stream memory interface device to calculate the addresses in memory of successive data values. In some embodiments, a stream descriptor may be represented with a single parameter such as TYPE, or alternatively with a single parameter such as START_ADDRESS. In yet another embodiment, the parameters such as stride, SPAN, and SKIP are constants to represent a static shape in memory. The stream parameters are stored in a row of the symbol table for stream s1. In this example, the parameter values for stream S0 are given in row 704 of the table and the parameter values for stream S1 are given in row 706. The symbol table defines how data is routed between threads referenced in the CFG 314 and how the data is stored in the memory of the processor. In particular, for each stream 708 in the symbol table, the symbol table includes references 710 to the head and tail connection of each data channel in the computation threads and data access threads referenced in the CFG. It is noted that the terms 'head', 'tail', 'sink', 'source' and 'ports' are used to indicate connectivity and direction of data transfer for each data channel. In one embodiment, a compiler automatically determines the direction of data transfer from the CFG without explicitly definition by the programmer. These connections determine if a stream is an input or an output stream. In addition, the stream descriptors 712 are stored in the table. The symbol table 700 may include the attributes 714 of the memory. It will be apparent to those of ordinary skill in the art that various parameters may be used to describe the memory locations and access patterns of the data for input and/or output associated with memory access threads.

The symbol table 700 in FIG. 7 indicates that there is a data stream (S2) from computation thread T0 that is written to BRAM (block random access memory) using memory access thread M2. The symbol table 700 also indicates that there is a memory access thread M3 that reads from BRAM and provides a data stream (S3) to computation thread T1. Both BRAM accesses use the same memory locations, but the locations are accessed in a different order, as indicated in FIG. 4 and FIG. 5. A FIFO buffer cannot be used in this situation, so a tile buffer is used. In accordance with one aspect of the present invention, the tile buffer is configured in the reconfigurable hardware. The tile buffer is accessed via stream memory interfaces in the reconfigurable hardware, so that system bus and memory controller resources are not used. The data transfer between computational modules is more tightly coupled, which facilitates higher processing speeds.

Figure 8:
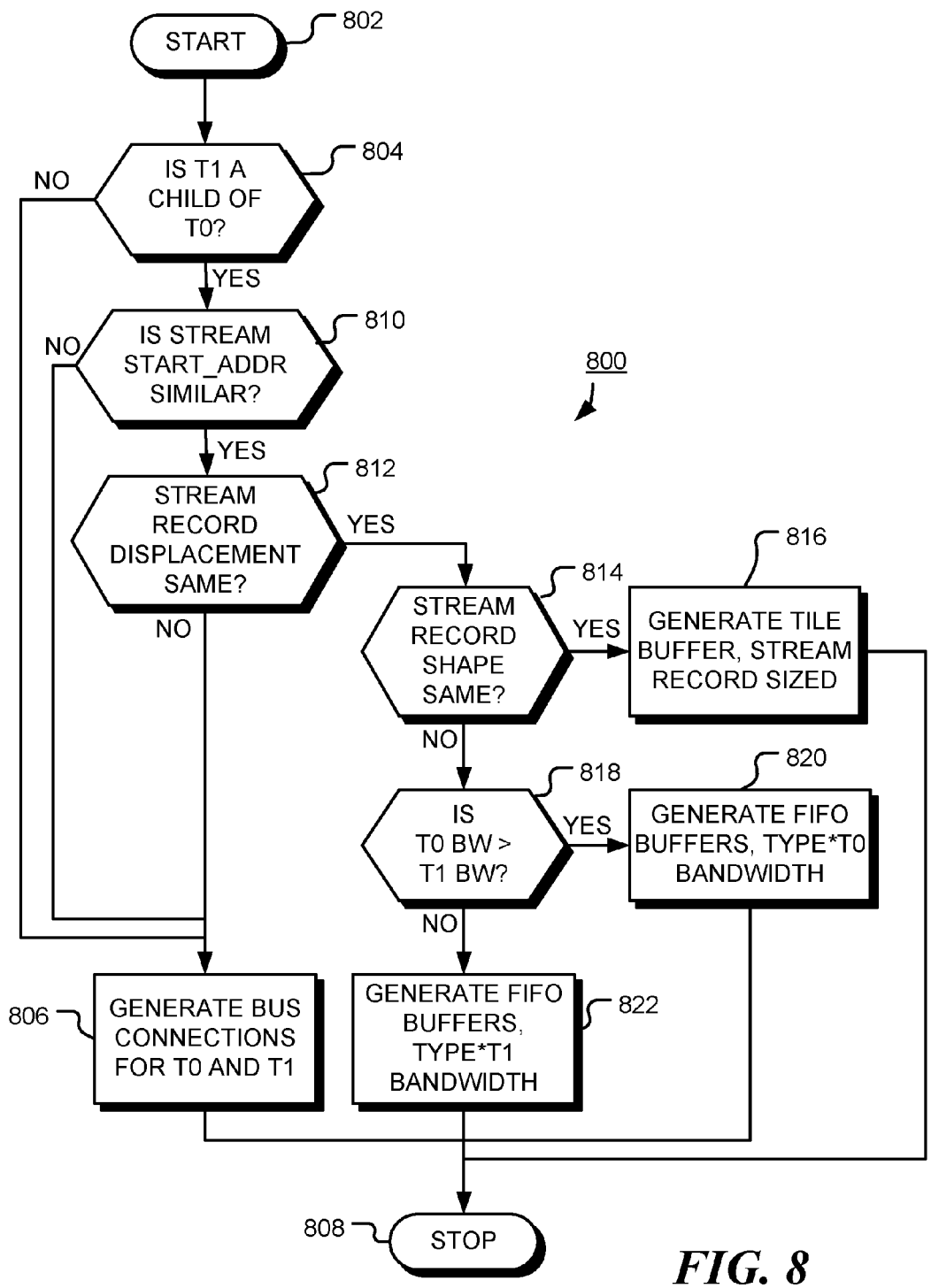
FIG. 8 is a flow chart of a method to select the interconnection logic circuit in accordance with some embodiments of the invention.

FIG. 8 is a flow chart of a method 800 to select the interconnection logic circuit of a configurable circuit based on entries in the symbol table and CFG. Following start block 802, the CFG is used to decide, at decision block 804, if the head and tail of two streams, T0 and T1, are parent and child respectively. This is done to select a data channel between two computation modules that can be connected with a FIFO or tile buffer. If the head and tail threads T0 and T1 are not parent-child respectively, as indicated by the negative branch from decision block 804, bus interfaces are generated at block 806 to move stream data to and from memory. If the head and tail threads T0 and T1 are parent-child respectively, as indicated by the positive branch from decision block 804, the method proceeds to decision block 810 where the START_ADDRESS parameters are compared. This is done to select only threads that are operating on the same data elements. If the START_ADDRESS parameters are different, as indicated by the negative branch from decision block 810, bus interfaces are generated at block 806 to move stream data to and from memory. If the START_ADDRESS parameters are the same, as indicated by the positive branch from decision block 810, the method proceeds to decision block 812 where the stream record displacements are compared. A stream record is a collection of stream elements bounded by a combination of stream parameters, for example, the STRIDE, SPAN, SKIP, TYPE and COUNT parameters that define the elements and access pattern in FIG. 4 and FIG. 5. This is done to select only threads that are operating as a producer/consumer manner. In one embodiment, the comparison is accomplished by comparing the values in the SKIP1 and SPAN1 fields of the S2 and S3 stream descriptors (shown in FIG. 7). If the stream record displacements are different, as indicated by the negative branch from decision block, the method again proceeds to block 806 where a bus interface is generated to move stream data to memory. If the stream record displacements are the same, as indicated by the positive branch of decision block 812, the method proceeds to decision block 814 where the record shapes are compared. In one embodiment, this is determined by comparing the stride, SPAN0, SKIP0, TYPE and COUNT parameters of the S2 and S3 stream descriptors. If the stream record shape is not the same, then the method proceeds to block 816 where a tile buffer, sized to the larger of S2 or S3 stream record size. If the stream record shape is not the same, as indicated by the negative branch from decision block 814, the bandwidth of T0 and T1 are compared at decision block 818. FIFO buffers sized to the product of T0 bandwidth and the TYPE stream descriptor parameter (for example, in bytes) are generated at block 820 is the T0 bandwidth is greater than the T1 BW, otherwise, as indicated by the negative branch from decision block 818, FIFO buffers, sized to the product of T1 bandwidth and TYPE stream descriptor parameter (for example, in bytes), are generated at block 822. FIFO buffers are used when the access patterns of the stream record are the same for both T0 and T1. From blocks 816, 820, and 822 the process terminates at block 806.

For the example CFG and Symbol Table entry in FIG. 6 and FIG. 7, a tile buffer would be generated since the stream record shape (access order) is not the same, as shown in FIG. 4 and FIG. 5.

It should be noted that the method 800 represents only an exemplary embodiment. For example, a buffer can still be used between accelerators even if the record displacement is not the same, if the programmer carefully maintains the state. In other embodiments, stream descriptor parameters may be generated or converted from existing parameters such that the location and shape are similar. Furthermore, at block 814, a threshold can be used in addition to the comparison of record shape, in order to set a different buffer size. The entire method 800 can be placed in an iterative loop such that different thread bandwidths (which are compared at block 818) can used to generate different FIFO buffers.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for automatic generation of a specification for a configurable processor, the method comprising:
   generating a specification of a first stream memory interface to be operable to access data in accordance with a first stream descriptor;
   generating a specification of a second stream memory interface to be operable to access data in accordance with a second stream descriptor;
   generating a specification of an interim data storage device to be accessed by the first stream memory interface and the second stream memory interface and to be operable to receive data from a first computational module via the first stream memory interface and to transfer data to a second computational module via the second stream memory interface; and
   outputting the specification of the configurable processor, the specification of the configurable processor comprising the specifications of the first stream memory interface, the second stream memory interface and the interim data storage device;
   wherein the specification of the interim storage device comprises a register transfer level (RTL) description;
   wherein the step of generating a specification for the first and the second stream memory comprises specifying how the first or the second stream memory interface are to be implemented on the configurable processor.

2. A method in accordance with claim 1, further comprising configuring the configurable processor in accordance with the specifications of the first stream memory interface, the second stream memory interface and the interim storage device.

3. A method in accordance with claim 2, further comprising:

configuring the first computational module in the configurable processor; and configuring the second computational module in the configurable processor.

4. A method in accordance with claim 1, wherein the interim storage device comprises a tile buffer.

5. A method in accordance with claim 1 wherein the first and second stream descriptors are included in a plurality of programming instructions of a high level language that define an application, the plurality of programming instructions further comprising first and second computation thread definitions, and first and second memory access threads, the method further comprising:

compiling the plurality of programming instructions of the application to produce a description of a data flow between the first and second computational threads and the first and second memory access threads;

generating a control flow graph (CFG) including references to the first and second one computation threads; and generating a symbol table with references to the first and second data access threads, the first and second computation threads and the first and second stream descriptors, wherein the specifications of the first and second stream memory interfaces and the specification of the interim data storage device are generated with reference to the symbol table.

6. A method in accordance with claim 5, further comprising generating a specification of a bus connection between the first computational module and a memory and between the second computational module and a memory if the second computational thread is not a child of the first computational thread.

7. A system in accordance with claim 1, wherein the first and second stream descriptors comprise at least one of a $START_{13}$ ADDRESS, a STRIDE value, a SPAN value, a SKIP value, and a TYPE value.

8. A method in accordance with claim 7, further comprising generating a specification of a bus connection between the first computational module and a memory and between the second computational module and a memory if the START_ADDRESS value defined by the first stream descriptor is dissimilar to the START_ADDRESS value defined by the second stream descriptor or if the stream record displacement defined by the first stream descriptor is dissimilar to the stream record displacement defined by the second stream descriptor.

9. A method in accordance with claim 7, further comprising generating a specification of a FIFO buffer connection between the first computational module and the second computational module and a memory if the START_ADDRESS value defined by the first stream descriptor is similar to the START_ADDRESS value defined by the second stream descriptor, and the stream record displacement defined by the first stream descriptor is the same as the stream record displacement defined by the second stream descriptor, but the record shape defined by the first stream descriptor is different to the record shape defined by the first stream descriptor.

* * * * *

UNITED STATES PATENT AND TRADEMARK OFFICE
CERTIFICATE OF CORRECTION

PATENT NO. : 7,802,005 B2  Page 1 of 1
APPLICATION NO. : 11/694523
DATED : September 21, 2010
INVENTOR(S) : Chai et al.

It is certified that error appears in the above-identified patent and that said Letters Patent is hereby corrected as shown below:

In Column 7, Line 45, delete "So" and insert -- so --, therefor.

In Column 7, Line 53, delete "So" and insert -- so --, therefor.

In Column 8, Line 27, delete "COUNT);" and insert -- COUNT). --, therefor.

In Column 8, Line 39, delete "s1." and insert -- S1. --, therefor.

In Column 12, Line 5, in Claim 7, delete "system" and insert -- method --, therefor.

In Column 12, Line 7, in Claim 7, delete "START$_{13}$ ADDRESS," and insert
-- START_ADDRESS, --, therefor.

Signed and Sealed this
Twenty-seventh Day of November, 2012

David J. Kappos
*Director of the United States Patent and Trademark Office*